(12) United States Patent
Karthik et al.

(10) Patent No.: US 7,295,144 B1
(45) Date of Patent: Nov. 13, 2007

(54) QUANTIZER RESPONSIVE TO NOISE LEVEL FOR A WIRELESS COMMUNICATIONS SYSTEM

(75) Inventors: Vaidyanathan Karthik, Bangalore (IN); Partha Sarathy Murali, Hyderabad (IN); Sundaram Vanka, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 0 days.

(21) Appl. No.: 11/438,999

(22) Filed: May 22, 2006

(51) Int. Cl.
*H04N 7/26* (2006.01)

(52) U.S. Cl. ..................................... 341/200
(58) Field of Classification Search ............... 341/200, 341/143, 144, 155
See application file for complete search history.

(56) References Cited

U.S. PATENT DOCUMENTS 6,894,632 B1 * 5/2005 Robinson .................... 341/143
2003/0067976 A1 * 4/2003 Igarashi .................. 375/240.2

* cited by examiner

*Primary Examiner*—Brian Young
(74) *Attorney, Agent, or Firm*—Jay A. Chesavage

(57) ABSTRACT

A quantizer has a plurality of decision blocks, each coupled from input to output, where each decision blocks output generates a binary value that is an unchanged decision block input if the decision block input is below the threshold input level divided by a power of 2, or the decision block subtracts a threshold divided by the power of 2 and passes this result as the decision block output. The quantizer output is formed from the bits of each comparison from each decision block. The threshold is developed from a channel noise variance which may be multiplied by a scale factor related to coding type and rate. In this manner, a large number of input bits to be quantized may be converted to a smaller number of quantizer output bits, while preserving the dynamic range information required to correctly decode signals passed through a communications channel having multi-path frequency selective fading.

12 Claims, 9 Drawing Sheets

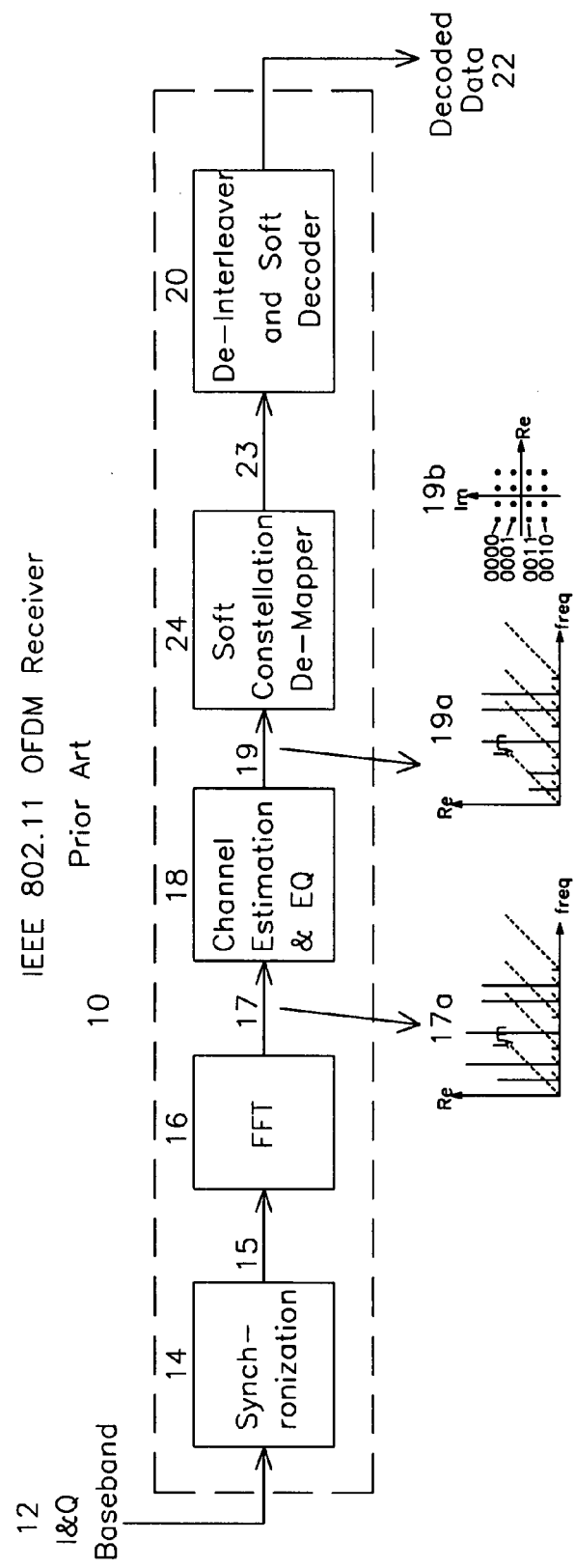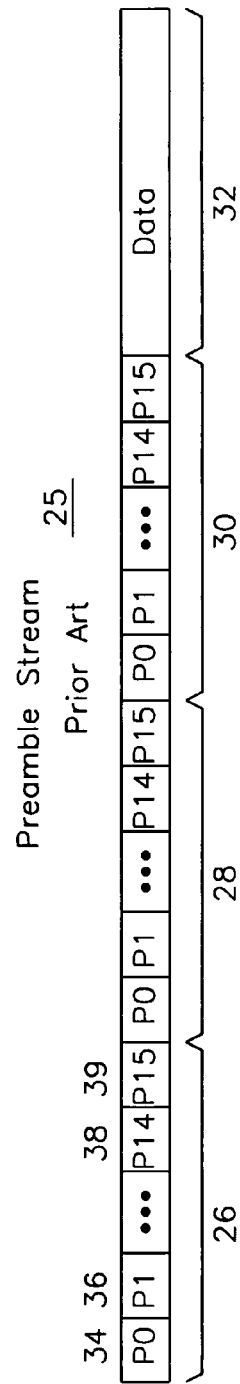

Packet Detection &
Coarse Frequency Offset
Prior Art

Packet Detection
Prior Art

Noise Estimator

L sample Accumulator

2L Sample Accumulator

OFDM Receiver with SINR enhancement

Channel Profile and Noise Spectrum

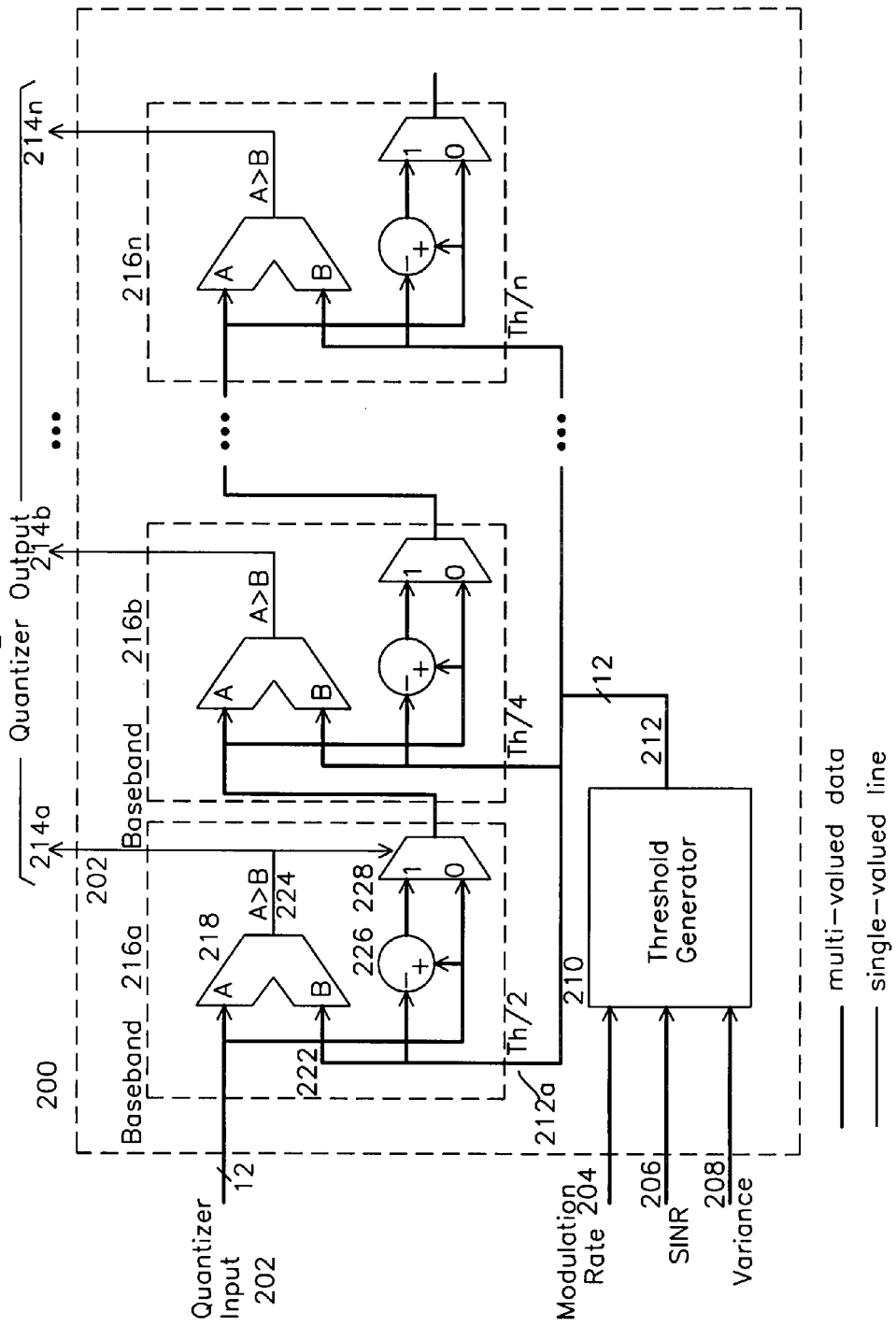

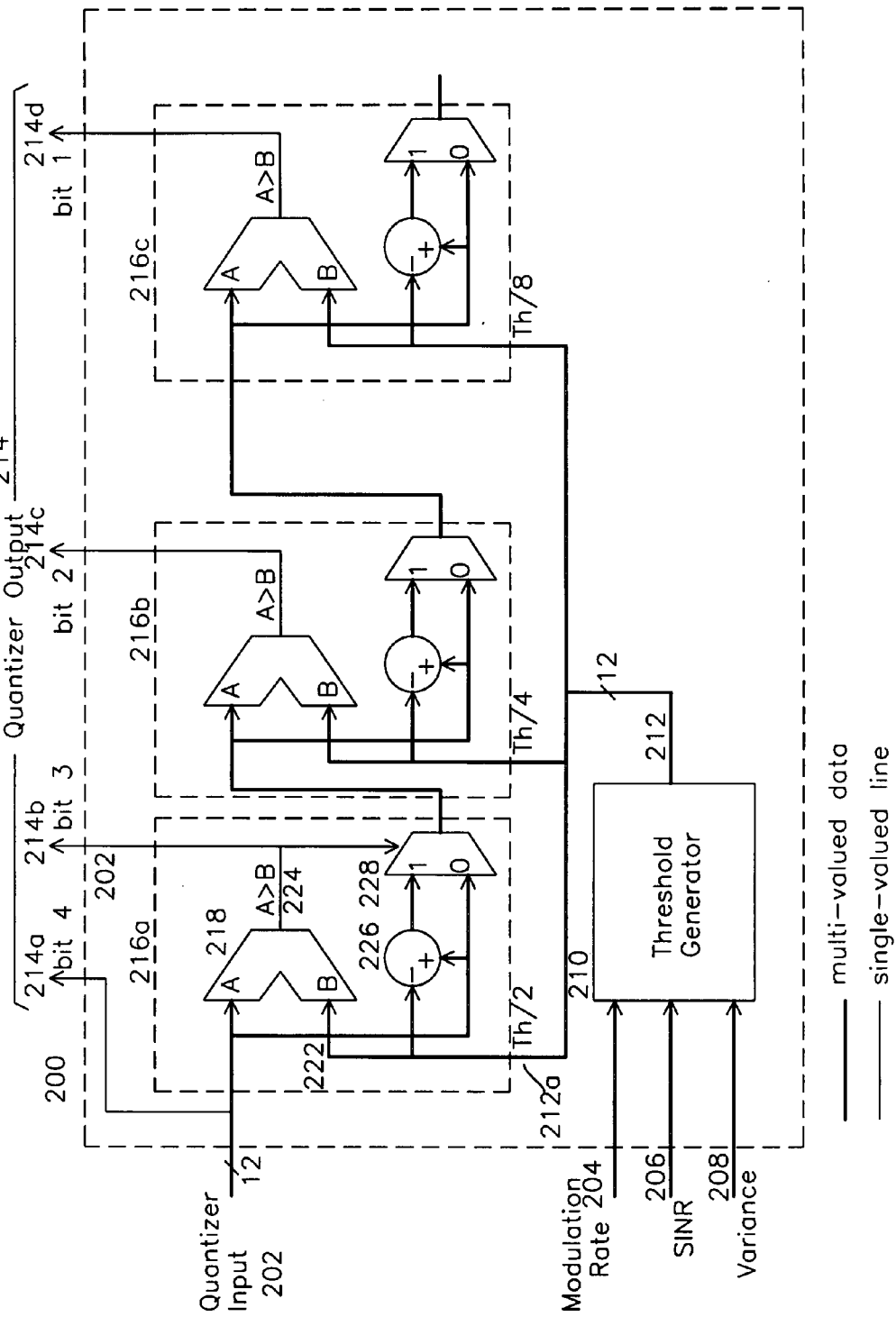

US 7,295,144 B1

QUANTIZER RESPONSIVE TO NOISE LEVEL FOR A WIRELESS COMMUNICATIONS SYSTEM

FIELD OF THE INVENTION

The present invention is directed to the field of noise estimators, particularly as used in wireless communications system to estimate the signal quality during a preamble interval.

BACKGROUND OF THE INVENTION

FIG. 1 shows a prior art OFDM receiver 10. A baseband signal 12 enters a synchronization function 14, which serves to identify phase and frequency offsets in the incoming signal 12, where they are fed back to an NCO (not shown) or a phase rotator (not shown) which removes the offsets and frequency drifts from the synchronized signal. The phase and frequency corrected signal 15 is delivered to an FFT 16 which recovers the combinations of OFDM subcarriers which comprise the transmitted data. FFT outputs 17 are shown as signal 17a, comprising linear combinations of FFT output data having real and imaginary components. The FFT output 17 is provided to a channel estimation and equalization function 18, which produces output 19 compensated for channel phase and magnitude variations. Plot 19a shows the output 19 in a frequency vs real and imaginary amplitude view, and plot 19b shows the corresponding constellation diagram for 16-QAM, where each position in a 16 QAM constellation diagram represents 4 bits of data after decoding. The output 19 of the channel compensator 18 is fed to the soft constellation de-mapper 24, which performs the function of converting the constellation into corresponding data values, and this output 23 is fed to the de-interleaver and soft decoder 20, which performs data decoding resulting in output data 22.

FIG. 2 shows a preamble stream 25 for an OFDM packet. The packet 25 comprises a sequence of preamble tones P0 through P15 which form a first preamble 26 followed by a second identical preamble 28, which is followed by a third preamble 30, and finally the packet data 32. During the preamble times corresponding to preambles 26, 28, and 30 of packet 25, the synchronization function 14 and channel estimation function 18 of FIG. 1 make estimations of channel frequency offset, phase offset, and channel frequency transfer function, respectively.

FIG. 3 shows one implementation of a prior art packet detection and coarse frequency offset synchronizer such as 14 of FIG. 1. The synchronizer comprises two parts, a coarse frequency offset part 40, and a packet detection part 60. The frequency offset estimator 40 accepts as an input a stream of complex OFDM symbols 92 and a delayed version 42 of the same stream, where the delay is equal to the interval of a single preamble interval 26. The conjugator 52 has the function of inverting the imaginary part of the incoming stream such that a+jb becomes a−jb. The product of (a+jb) (a−jb) produces the signal power level $a^2+b^2$, since the same-position preamble symbols are identical other than the frequency offset generated phase shift component from the earlier symbol to the later symbol. Consequently, the multiplier 44 output contains an imaginary component corresponding to the amount of phase shift from a first preamble symbol to a second preamble symbol. The Phase Finder 46, which is implemented as a CORDIC generates an output 47 which represents the phase φ of the incoming multiplier 44 product. The frequency may be then be estimated from change of phase per sample $\Delta\phi/\Delta t$. The output of CORDIC 46 is averaged 48 to generate a coarse frequency offset 50. This value is measured during the preamble interval and fed back to a numerically controlled oscillator (NCO, not shown) or phase rotator (not shown) to remove any frequency offset during the balance of the packet receive time prior to performing the FFT, where such frequency offset would result in an offset in the FFT 16 of FIG. 1 outputs.

The symbol timing may be extracted from the processing shown as packet detection system 60 of FIG. 3. The incoming stream of baseband OFDM symbols are delayed 62 by a time equal to a preamble interval, and the preamble stream 92 is multiplied 66 by a delayed preamble 63 and conjugated 64 to produce multiplier 66 output 67. This output 67 is averaged over an interval equal to the number of symbols in a preamble (shown as 16 symbols) to generate a value Cn 74, which represents the power level of the signal, as before. During the preamble interval, the multiplication of a current preamble symbol with the same symbol from a previous preamble results in the output 67 of the multiplier 66 representing the correlated signal power. The averager 70 sums the previous preamble values (shown for a 16 symbol preamble) to generate a power value Cn 74 whose value represents the noise plus interference component of the SINR value to be determined. The output 63 of the delay element 62 is multiplied by a conjugate 64 value 65 to produce a product 69, which is averaged over the same preamble interval by averager 72 to generate a signal plus noise power level 76. Since there is very little signal correlation from one symbol of a preamble to the next, the output Pn 76 provides an indication of the uncorrelated noise plus interference level, which includes unrelated noise and interference effects such as preamplifier gain in the RF signal processing chain and reflected signal energy, in contrast to the correlated value Cn 74 indicates the correlated power level of the incoming stream during the preamble interval. Cn 74 and Pn 76 are ordinarily used to establish the symbol timing referenced to the preamble, and one such method is to divide 78 the absolute value of Cn 84 by the noise plus signal level Pn 76 to generate a figure of merit μ 85, and to associate packet detection 90 with μ 85 crossing some predetermined threshold using a comparator 88.

FIG. 4 shows the signals for the prior art packet detection system of FIG. 3. The packet preamble is shown as 120, while signal power 67 is shown as 122 and noise and interference power signal 69 is shown as 124. Output Cn 74 is shown as signal 126, and output Pn 76 is shown as signal 128, which both rise during second preamble time t2, which corresponds to interval 28 of FIG. 2. The ratio of Cn/Pn is shown on waveform 127, and when waveform 127 crosses threshold 125, start of packet 121 is indicated, while end of preamble/start of data/symbol timing may be detected by falling correlated signal waveform 122 edge 123.

The use of existing signals Cn and Pn is known in the prior art for symbol timing and packet detection, and it also known in the prior art to change demodulation method and transmission speed based on error rate at the detector. It is desired to generate a SINR estimate using these signals for use in demodulation, particularly following the soft constellation demapping step, whereby the quantization method performed on the demapped data may be changed in accordance with the value of SINR as determined during the preamble synchronization step.

An estimate of the receiver signal quality can be used to improve the performance or reduce the complexity of baseband processing functions. An estimate of the noise variance is a sufficient measure of the signal quality, as the AGC (Automatic Gain Control) function of the RF receiver (not shown) ensures constant input power to a base-band system. Typically, symbol decisions are compared with the received symbol to obtain an error vector. The error vectors can be averaged to obtain an estimate of the noise variance as discussed in U.S. Pat. No. 5,379,324. The symbol decisions can be made at the input to the decoder, or at the decoder output. Using decisions from the output of the decoder provides a better estimate of the noise variance. Both these techniques have significant latency, and it is useful to have an estimate of signal strength established during the preamble interval so that it may be used during the data interval of the same packet. It is desired to have a signal strength estimation for use in an OFDM system which relies on parameters which can be established during the preamble interval.

A technique for synchronization based on a training sequence consisting of repeating patterns is described in "Robust Frequency and Timing Synchronization for OFDM", IEEE Transactions on communications, December 1997. As noted in FIG. 3 and FIG. 4, due to the repeating preamble symbols, a correlation peak is observed at the end of the training sequence. This peak is used to detect a valid reception. The position of the peak also indicates the symbol boundary.

The correlation be represented as, $$C(n) = \sum_{n-L<k\leq n} X(k) * X(k-L)^*$$

The signal energy is computed as, $$E(n) = \frac{1}{2} \sum_{n-2L<k\leq n} |X(k)|^2$$

The normalized value used for symbol timing is given by $$Y(n) = \frac{|C(n)|^2}{E(n)^2}$$

In an OFDM system, the soft metric values can be weighed by the corresponding channel estimates resulting in a significant improvement in receiver performance. A simple technique to generate soft metrics with channel weighting is discussed in "Simplified Soft-Output Demapper for Binary Interleaved COFDM with application to Hiperlan/2" by Tosato et al.

In a frequency selective fading environment, where OFDM is typically employed, the frequency domain channel estimates have large peaks and nulls and therefore a large dynamic range as shown in 148 FIG. 7. This requires a large soft metric bit-width to accurately represent the reliability information. A large soft-metric bit-width results in a significant increase in area as bit-widths in De-Interleaver and Soft decoder blocks increase. A non-uniform quantization technique could be used but it leads to increased complexity in the soft decoders.

A technique for soft metric quantization is discussed in U.S. Pat. No. 5,379,324. This technique uses statistical information from the output of the soft metric quantization to adjust the quantization threshold. This is however an iterative process with inherent latency. The proposed technique provides a simpler technique to determine the quantization threshold for OFDM systems without any latency.

U.S. Pat. No. 5,214,675 by Mueller et al. describes a system for compensating for multi-path reflection in a communications system by computing a variance of the signal and providing this signal to a filter which compensates for multipath delay.

U.S. Pat. No. 6,792,055 by Hart describes a system for use in QAM whereby the strength of the demodulated signal is fed back to a gain control. In another embodiment, the decoder makes hard and soft decisions according to a variable threshold which is set by the strength of the signal applied to the decoder.

U.S. Pat. No. 5,740,203 describes a prior art demapper for QAM and PSK modulation methods which performs the function of block 24 of FIG. 1 or block 140 of FIG. 6.

U.S. Pat. No. 5,379,324 by Mueller et al describes a system for computing gain and noise variance of a channel for use in correcting the channel.

OBJECTS OF THE INVENTION

A first object of the invention is to generate an estimate of SINR using signals from a prior art symbol detection function.

A second object of the invention is to generate an estimate of SINR from a preamble symbol stream.

A third object of the invention is to generate an estimate of SINR from a preamble stream, a delayed preamble stream, a conjugator, and two multipliers.

A fourth object of the invention is to generate a threshold value from an SINR value, and use the threshold value to quantize demapped values.

SUMMARY OF THE INVENTION

An estimate of noise is given by V(n)=(E(n)−C(n))/L, measured when the ratio of $En^2/Cn^2$ is at a maximum during a packet interval, where E(n) is derived from the incoming symbol stream 92 $X_k$ where a delay element 62 with a delay interval L equal to a preamble interval generates a delayed incoming stream which is multiplies the incoming symbol stream 92 $X_k$ with the delayed and conjugated copy 65 of the symbol stream to generate a first multiplier 66 output 67 X(k)*X(k−L)*. A second multiplier 68 generates an output 69 X(k)*X(k)* from the product of the delayed symbol stream 63 multiplied by a conjugated copy of the delayed symbol stream 65. The complex outputs of the first multiplier 66 are summed over a preamble interval L in accumulator 70, the output of which is fed to phase finder 152 which generates magnitude 156. The magnitude 156 is scaled by the accumulator interval L by scaler 512, and this result is subtracted from the second multiplier 68 output 69 summed 72 over two preamble intervals (2L) and scaled by 2L, thereby generating an estimate of noise level 162. Qualifier 166 generates signal 168, which indicates when noise estimate 162 is valid, which is optionally at the time when the ratio of $En^2/Cn^2$ is at a maximum.

As discussed earlier, the frequency-offset estimate is computed from the angle of the correlation output ∠C(n) at the peak of Y(n).

The noise estimator is coupled to a constellation soft de-mapper having an adjustable level quantizer. The ability to vary the quantizer threshold according to signal level reduces the complexity of the Viterbi decoder which follows the quantizer.

BRIEF DESCRIPTION OF THE DRAWINGS

FIG. 1 shows the block diagram for a prior art 802.11 OFDM receiver.

FIG. 2 shows a stream of preamble symbols.

FIGS. 5b and 5c show the accumulators of FIG. 5a.

FIG. 8 shows the block diagram for a quantizer using SINR.

FIG. 9 shows the block diagram of a 4 bit quantizer.

DETAILED DESCRIPTION OF THE INVENTION

Figure 3:
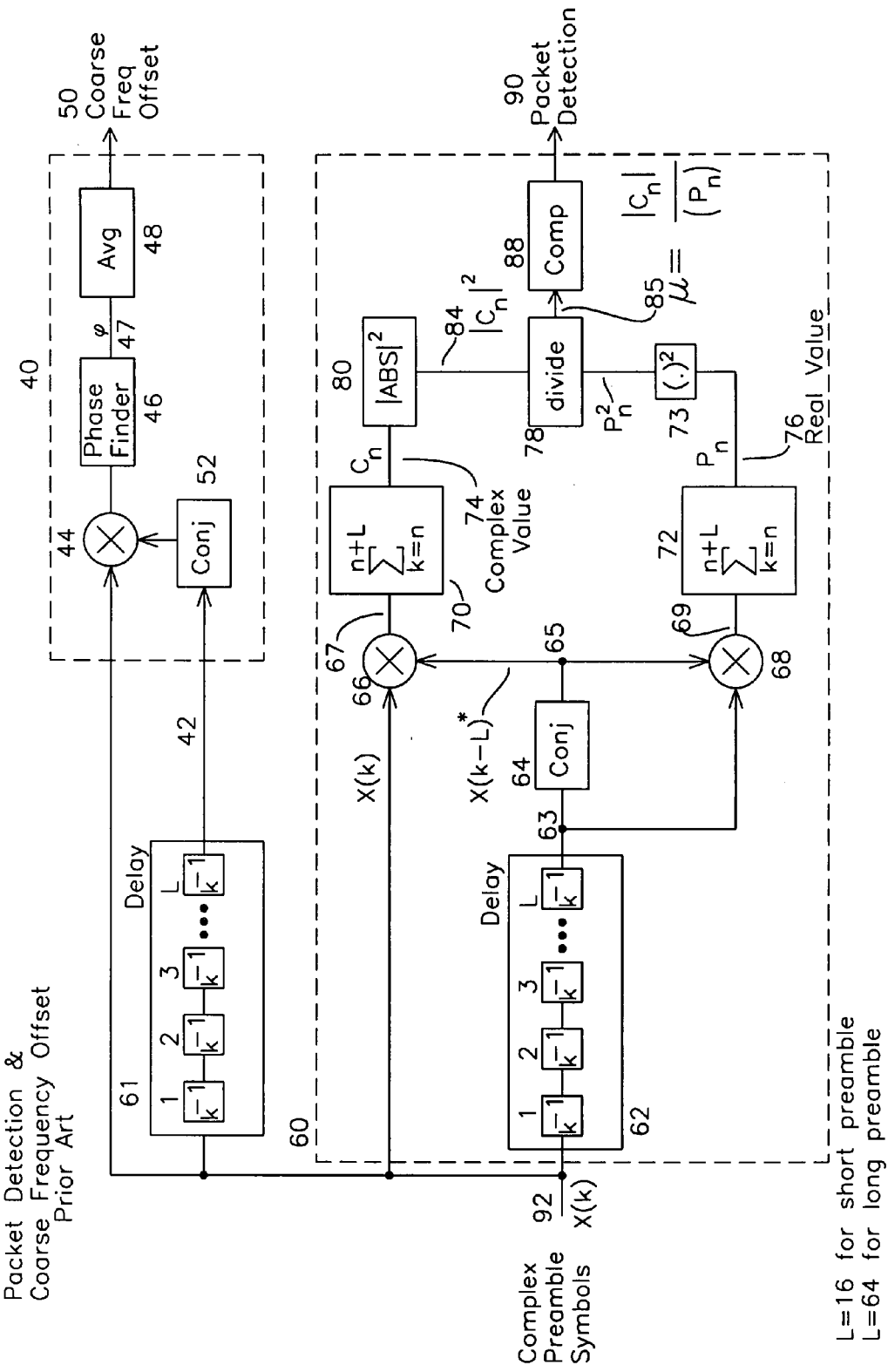
FIG. 3 shows the block diagram for a prior art packet detection and frequency offset subsystem.
Figure 4:
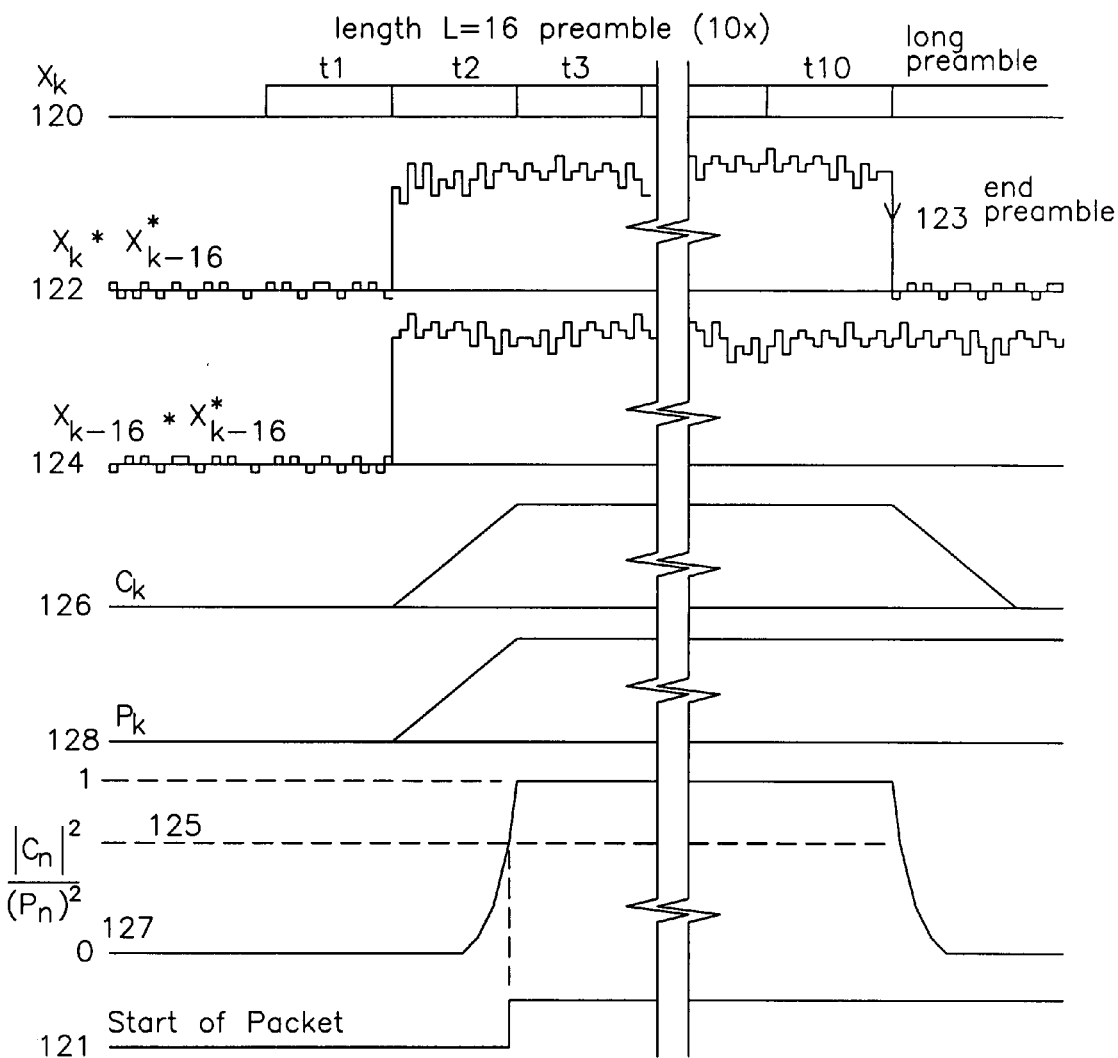
FIG. 4 shows the waveforms of the prior art system of FIG. 3.
Figure 5A:
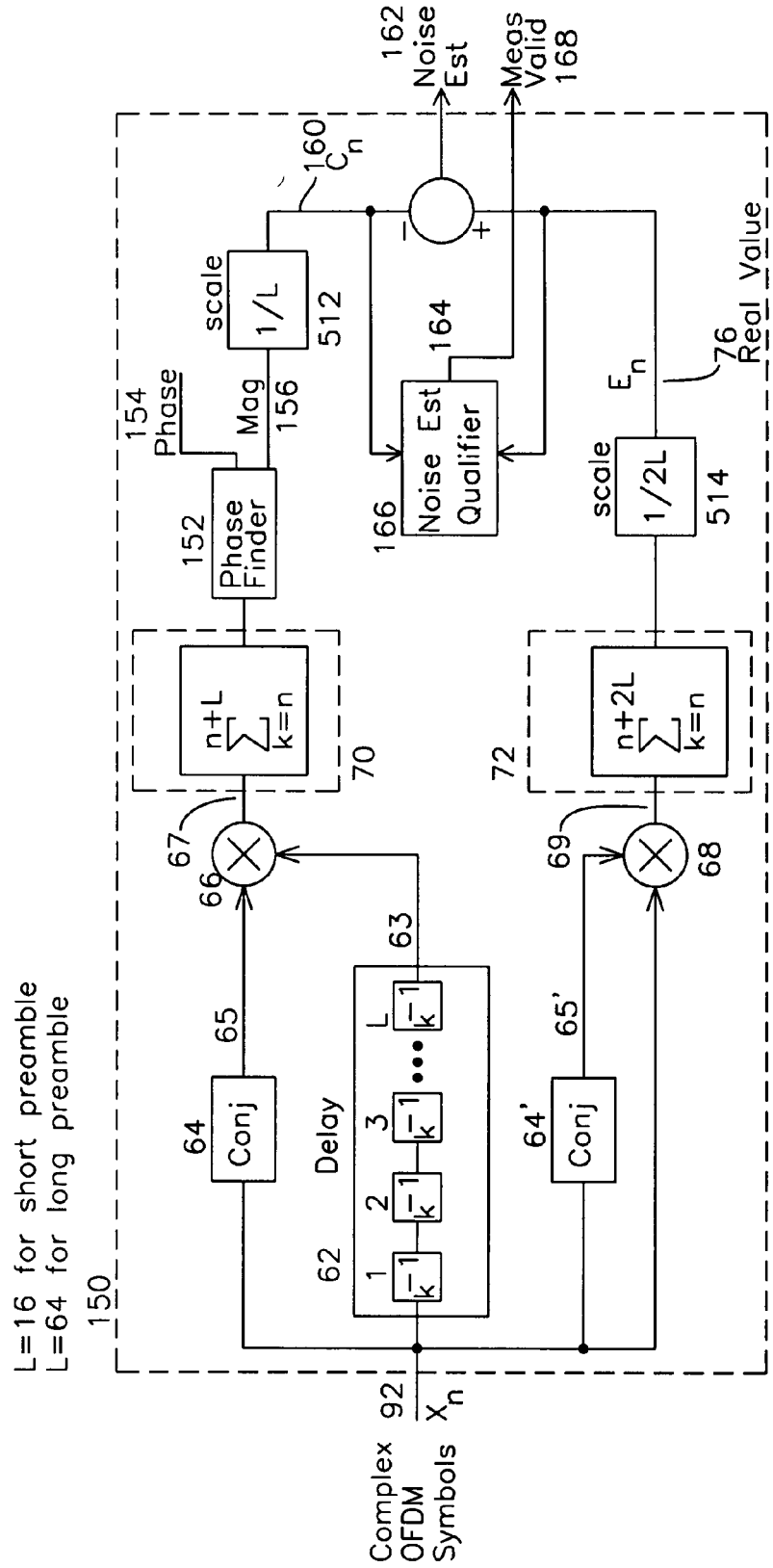
FIG. 5a shows the block diagram for an OFDM noise estimator.

FIG. 5a shows a block diagram for the present noise estimator 150, which may be used as the synchronization function such as 14 of FIG. 1. The synchronization technique shown in FIG. 5a yields a signal quality estimate in the form of noise measurement 162 in conjunction with qualifier signal 168. The reference numbers of FIG. 5a perform similar functions as shown in FIG. 3. As was described earlier, incoming preamble stream 92 is conjugated 64' to generate a conjugated output 65' which is multiplied by second multiplier 68 to second multiplier output 69, which is summed 72 over two preamble intervals 2L and scaled by 2L 514 to form real valued En 76. The input signal 92 is simultaneously delayed 62 by preamble length L and multiplied by conjugated 64 multiplied by the input stream 92 using first multiplier 66 to generate output 67 as before, which is accumulated over a preamble interval L in accumulator 70, the output of which is fed to the phase finder CORDIC 152 which provides a phase output 154 as well as a magnitude output 156, which is scaled by preamble interval L to produce Cn 160. An estimate of the noise level 162 can be obtained by subtracting the magnitude of the correlation output |C(n)| 160 from the signal energy E(n) 76 when Y(n) reaches its peak value. In the prior art of FIG. 3, deriving the magnitude of C(n) from $C(n)^2$ 84 would require a square root computation. However, in FIG. 5, the CORDIC processor 152 that is used to compute the angle 154 of C(n) for the frequency offset estimation of FIG. 3 can also compute the magnitude of C(n) 156. The CORDIC processor 152, as known in the prior art, accepts a real and imaginary component as input 67 (a+jb), and generates a phase output 154 corresponding to $\tan^{-1}(b/a)$ and a magnitude output corresponding to $\sqrt{a^2+b^2}$. In this manner, a noise estimate V(n) 162 for the incoming signal 92 can be generated by subtracting the correlated signal level 160 from the noise plus interference output 76. Qualifier 166 generates signal 168, which indicates when noise estimate 162 is valid, which is optionally at the time when the ratio of $En^2/Cn^2$ is at a maximum. An AGC function in the RF processing is performed prior to processor 130, and results in increasing the receiver gain when the incoming signal level is weak, and decreasing the receiver gain when the incoming signal level is strong, thereby optimizing the use of the digitization dynamic range. The AGC function generates a relatively constant En level 76, which results in an improved noise estimate 162. It is also possible to scale the noise estimate 162 by the length of the preamble, shown as L=16 for a short preamble, and L=32 for a long preamble. Generally, a longer sample size produces more accurate estimates of noise variance. In this manner, an improved estimator for noise level for use in a communications receiver is described.

Figure 5B:
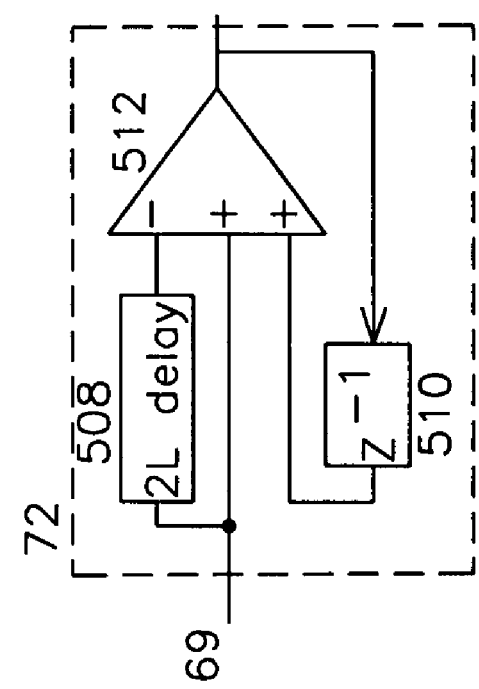

FIG. 5b shows an embodiment for accumulator 70, which takes an input 67 and sums 504 the input 67 with a one-sample delayed output 506 and subtracts out an L delayed 502 version of the input 67. In this manner, the output of the first accumulator represents the sum of the previous L samples.

Figure 5C:
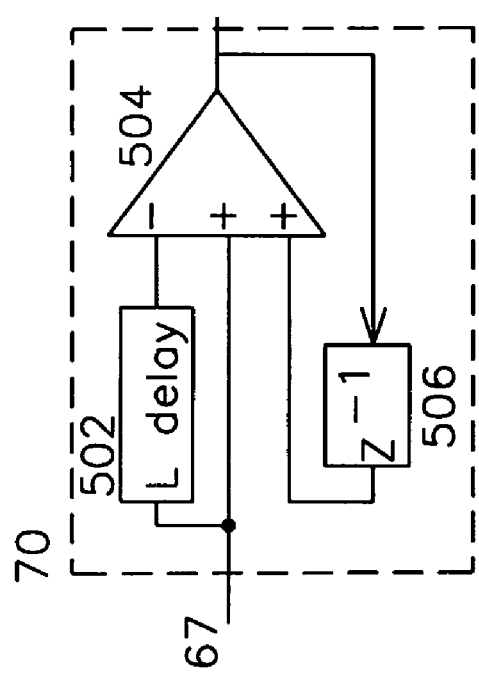

FIG. 5c similarly shows an embodiment for the accumulator 72, which receives an input 69 and sums 512 the input 69 with a one-sample delayed output 510 and subtracts out a 2L delayed 508 version of the input 69. In this manner, the output of the second accumulator represents the sum of the previous 2L samples.

Figure 7:
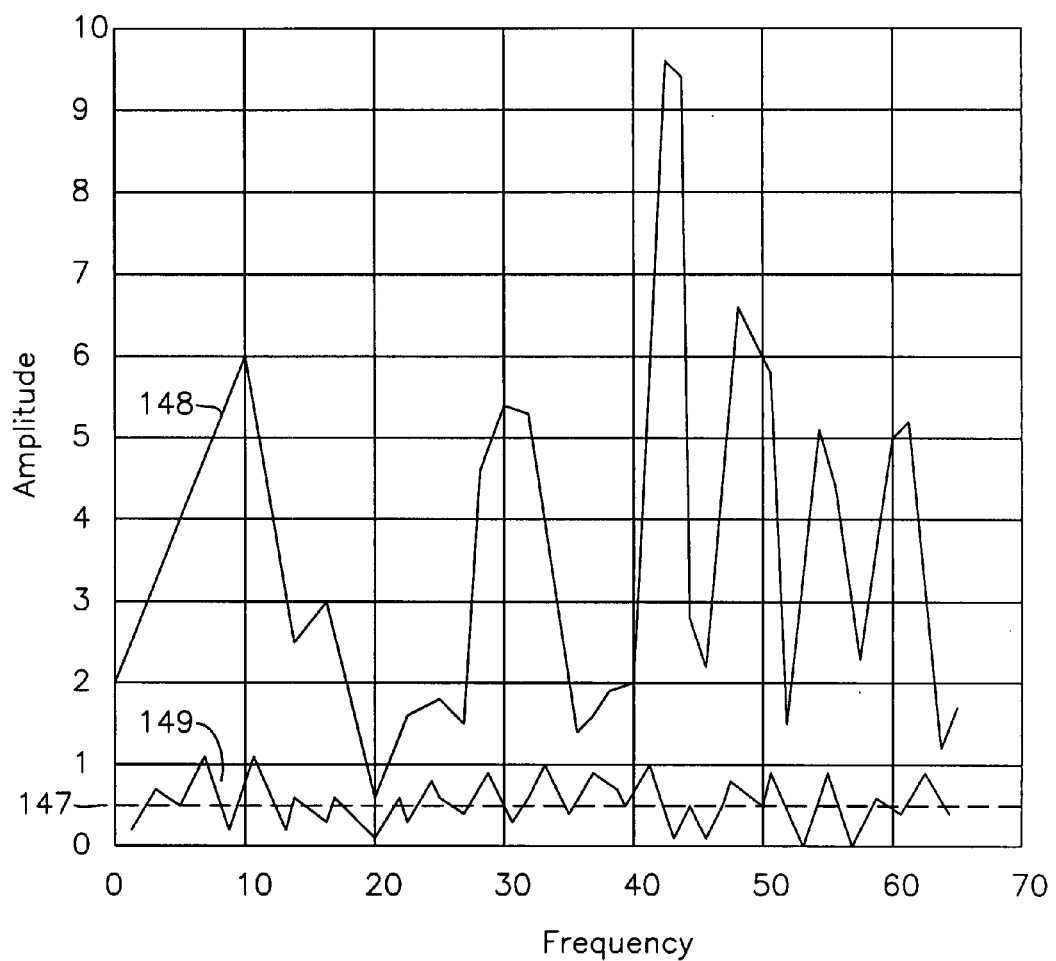
FIG. 7 shows a channel profile and noise spectrum plot.

A technique is proposed in the present invention that modifies the quantization threshold level T depending on the average noise level n. Any soft metric values greater than the threshold are clipped and uniform quantization is applied within the threshold. Therefore, sub-carriers with a Signal To Noise ratio (SNR) greater than $$\frac{T^2}{n^2}$$

are clipped. Since sub-carriers with large SNR are more reliable, loss of information resulting from clipping for these sub-carriers does not significantly affect the receiver performance. Therefore, the quantization range is limited to sub-carriers with lower SNR, resulting in a lower quantization bit-width. Examining FIG. 7, an upper level 148 defined by the noise level 149 forms the boundary limit for such a quantization threshold, and this quantization may be set to a smaller step size when the noise level is low compared to the signal, and the quantization step size may be increased when the noise level is high compared to the signal.

There are two signal conditions and two SNR conditions to consider. In the absence of signal reflections, the frequency fading of the communications channel is flat in frequency, which is to say that all of the subcarriers have the same SNR. Typically in this condition, 4 bits of quantization are sufficient to represent the soft values at low SNR, and at high SNR 1 bit of quantization is sufficient. The utility of the present invention is realized in the case of multipath reflections with frequency selective fading, where all of the subcarrier levels have to be accommodated to maintain sufficient sampling of the lower amplitude carriers, which would require the generation of 12 bit soft values in the prior art. This increased complexity would be carried through to the Viterbi decoder, as described below. In the present invention operating on signals in the presence of multipath reflection with frequency selective fading, a suitable quantization threshold can be found such that 4 bit soft values can be generated and sent for subsequent processing, for example, by a Viterbi decoder.

The advantage of using a signal strength dependent quantizer prior to the decoder is reduced system complexity. When the SNR is high, the Viterbi decoder 144 of FIG. 6 may operate satisfactorily on 4 bits of data, and may continue to operate satisfactorily as the SNR decreases, as long as the channel is flat. In such a case the performance of the receiver is dominated by AWGN. Multi-path reflections in the channel generally increase the number of data bits required for the same level of performance, up to 12 bits as may be used in a decoder operating in an environment with multi-path reflections. In such a case the performance of the receiver is also affected by the frequency selective variations in channel envelope. The use of the quantizer 142 of the present invention as shown in FIG. 8 in conjunction with a threshold generator operating on data from the synchronizer 134 allows the incoming data to be reduced to a smaller number of data bits, thereby saving power and reducing decoder complexity in the decoder 144.

Figure 6:
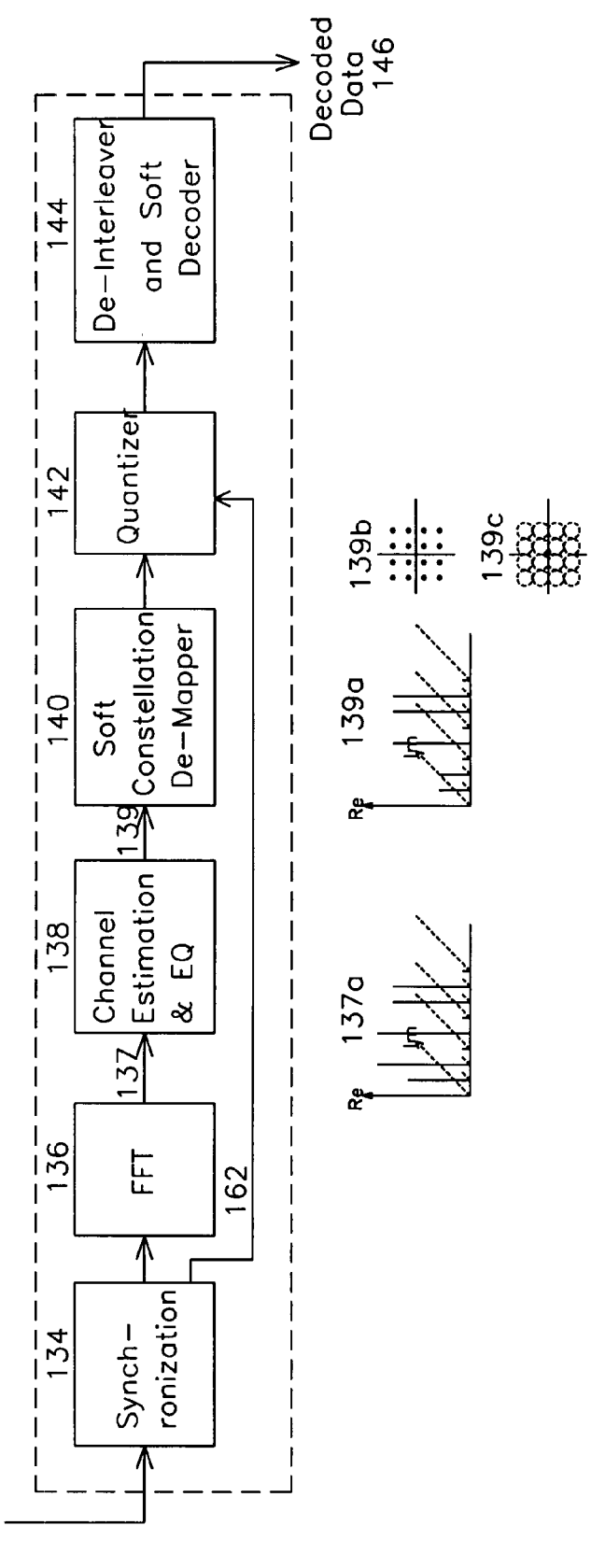
FIG. 6 shows the block diagram for an OFDM receiver with SINR enhancement.

FIG. 6 shows a modified OFDM receiver with adaptive soft metric quantization. The signal quality estimates 162 derived from the synchronization process are fed to the quantizer 142 after soft-demapping 140, where the quantizer 142 decision threshold varies based on the signal quality estimate 162, and other relevant parameters such as modulation order, code rate or signal variance. Comparing to FIG. 3, the output of FFT 137 shown as 137a contains a plurality of k subcarriers, each having a different magnitude and phase. The phase is channel equalized by equalizer 138 to generate equalized frequency domain output 139, which may be viewed as a constellation 139b with tightly formed real and imaginary responses (shown as small diameter circles) for high SINR and loosely formed responses (shown as larger diameter circles) as shown in figure 139c for poor signal to noise environments. The subcarriers are phase equalized but not amplitude equalized. Therefore the envelope of the signal constellation varies across subcarriers but the noise variance is the same. Hence subcarriers with large SNR will have a larger constellation envelope. This could be shown with 139b having a larger envelope as compare to 139c with circles of the same diameter as 139c.

It is desired to use the preamble generated noise estimate 162 to change the behavior of quantizer 142, in particular to simplify the quantization process for high signal to noise environments, and introduce more complex quantization for low signal to noise environments, where the signal to noise is determined during the preamble interval for the same received packet. The channel equalization block 138 includes provision for equalizing each of the FFT outputs as follows:

$Y_k$ is the symbol at the kth subcarrier.
$H_k$ is the channel coefficient of the kth subcarrier.
$X_k$ be the phase equalized value Then, $$X_k = Y_k * \overline{H_k}$$

Following the channel equalization 138, the phase-equalized values are used to generate the reliability metrics known as LLRs (Log Likelihood Ratio) using any available technique, including the one described in U.S. Pat. No. 5,379,324.

$|H_k|^2$ is the squared magnitude of the channel coefficient.
The LLR metrics $L_k$ for BPSK are given by, $$L_k = Re(X_k)$$

The LLR metrics $L_k$ for QPSK are given by, $$L_{k,1} = Re(X_k)$$

$$L_{k,2} = Im(X_k)$$

The LLR metrics $L_k$ for 16 QAM are given by, $$L_{k,1} = Re(X_k)$$

$$L_{k,2} = Im(X_k)$$

$$L_{k,3} = -|Re(Xk)| + 2*|H_k|^2$$

$$L_{k,4} = -|Im(Xk)| + 2*|H_k|^2.$$

The LLR metrics $L_k$ for 64 QAM are given by, $$L_{k,1} = Re(X_k)$$

$$L_{k,2} = Im(X_k)$$

$$L_{k,3} = -|Re(Xk)| + 4*|H_k|^2$$

$$L_{k,4} = -|Im(Xk)| + 4*|H_k|^2$$

$$L_{k,5} = -|Re(Xk) - 4*|H_k|^2| - 2*|H_k|^2$$

$$L_{k,6} = -|Im(Xk) - 4*|H_k|^2| - 2*|H_k|^2$$

Once the above metrics have been computed, the quantization threshold 212 of FIG. 8 is determined based on the variance, modulation and coding rate. Generally, the quantization threshold 212 increases with modulation order, code rate, and signal variance. Additionally, the quantization threshold 212 is scaled by modulation type and rate, as shown in the table below:

| Modulation & Rate | 64 QAM ¾ | 64 QAM ½ | 16 QAM ¾ | 16 QAM ½ | QPSK ¾ | QPSK ½ | BPSK ¾ | BPSK ½ |
|---|---|---|---|---|---|---|---|---|
| SCALE | 18.88 | 15 | 8.93 | 5.97 | 3.99 | 3.17 | 2.83 | 2.52 |

The above values are considered best mode for setting the threshold value. As it is possible to practice the present invention using scale factors which are outside the best mode set forth above, the above scale factors may be considered median values which may vary +100% to −50% from the best mode median values of the above table.

As is shown in FIG. 8, once the quantization threshold 212 is computed from the above metrics, it is passed to the quantizer 200, which comprises a plurality of decision blocks 216a,b, . . . n. Each decision block operates on the quantization threshold 212 in succession. The quantizer 200 receives an multi-valued input 202 from a soft demapper such as 140 of FIG. 6, and each decision block 216a compares the magnitude of the multi-valued input 202 with threshold 212. If input 202 exceeds the threshold 212, the comparator 218 generates a 1 output for that particular bit 214a, or if the values is below the threshold 212a, the output bit 214a is 0, and the threshold 212 is subtracted 226, and multiplexer 228 passes the remainder to the next stage 216b, which operates analogously on the remainder, applying the next bit position of the threshold 212b. In this manner, a quantizer output 214 is generated with one comparator 218 bit from each decision block 216a, 216b, . . . , 216n.

FIG. 9 shows a best mode 4 bit quantizer according to the present invention where the MSB is generated by the sign bit of the quantizer input 212, and the magnitude is passed on to the successive decision blocks 216a, 216b, 216c.

As is clear to one skilled in the art, the above examples are shown for clarity and explanation of operation, and are not intended to limit the invention to the specific embodiments described herein.

We claim:

1. A quantizer accepting a quantizer input and a quantizer threshold for generating a quantizer output, said quantizer having a plurality n of decision blocks, each said decision block having a data input, a threshold input, a data output, and a decision output formed by comparing said data input to said threshold input;

whereby when said data input is greater than said threshold input, asserting said decision output and coupling said decision block output to said data output less said threshold input, and when said data input is less than said threshold, not asserting said decision output, and coupling said decision block output to said data output;

where each adjacent said decision block data input is coupled to an adjacent said decision block data output;

and each said decision block threshold input is half the value of an adjacent said threshold input.

2. The quantizer of claim 1 generating a quantizer value wherein:

said quantizer input is provided to a first said decision block input with said decision block threshold input coupled to said quantizer threshold divided by 2, said decision block output generating said first quantizer output bit as asserted when said decision block input is greater than said decision block threshold input and generating said quantizer output as not asserted when said decision block input is less than said decision block threshold input;

each of said m comparator stages 2 through n has:

said m−2 decision block output coupled to an m−1 said decision block input with an m−1 comparator threshold input coupled to said quantizer threshold divided by $2^m$, said comparator output generating said quantizer output m−1 output as asserted when said decision block input is greater than said decision block threshold input and generating said quantizer output as not asserted when said decision block input is less than said decision block threshold input;

where said quantizer output is ordered with said first bit as the MSB, followed by said decision block 2 through n decision outputs.

3. The quantizer of claim 1 generating a 4 bit quantizer value where said quantizer input is a signed n bit said quantizer input MSB forms said quantizer MSB bit 4;

remaining said quantizer input n−1 bits are provided to a first said decision block input with said decision block threshold input coupled to said quantizer threshold input divided by 2, said decision block output generating said second quantizer output bit 3, said first decision block output coupled to a second said decision block input with said second decision block threshold input coupled to said quantizer threshold input divided by 4, said decision block output generating said quantizer output bit 2;

said second decision block output coupled to a third said decision block input with said third decision block threshold input coupled to said quantizer threshold input divided by 8, said decision block output generating said quantizer output bit 1 LSB.

4. The quantizer of claim 1 where said quantizer threshold is derived from at least one of a modulation rate, a noise variance, and a signal variance.

5. The quantizer of claim 4 where said quantizer threshold increases with a modulation order.

6. The quantizer of claim 4 where said quantizer threshold increases with code rate.

7. The quantizer of claim 4 where said quantizer threshold increases with variance.

8. The quantizer of claim 4 where said quantizer threshold varies according to a scale factor range having a range of −50% to +100% about a median scale factor, said scale factor applied to said modulation type and rate as follows:

if said modulation type is 64 QAM and said rate is ¾, said scale factor is 18.88;

if said modulation type is 64 QAM and said rate is ½, said scale factor is 15;

if said modulation type is 16 QAM and said rate is ¾, said scale factor is 8.93;

if said modulation type is 16 QAM and said rate is ½, said scale factor is 5.97;

if said modulation type is QPSK and said rate is ¾, said scale factor is 3.99;

if said modulation type is QPSK and said rate is ½, said scale factor is 3.17;

if said modulation type is BPSK and said rate is ¾, said scale factor is 2.83;

if said modulation type is BPSK and said rate is ½, said scale factor is 2.52.

9. The quantizer of claim 8 where said quantizer threshold scale factor is said median scale factor.

10. The quantizer of claim 7 where said variance is noise measured in a frequency-selective multipath communications channel.

11. A process for quantizing a multi-valued digital quantizer input to a reduced number of quantizer output bits, the processes including:

a first step of providing said quantizer input most significant bit (MSB) as a first quantizer output bit;

steps 2 through n being:

comparing each of m−1 decision block outputs coupled to m−1 said decision block input with said m−1 decision block threshold input coupled to said quantizer threshold divided by $2^m$, said decision block output generating each said respective quantizer output m−1 bit.

12. The process of claim 11 where said quantizer output is ordered with said first bit as an MSB through said quantizer LSB as said nth bit.

* * * * *

UNITED STATES PATENT AND TRADEMARK OFFICE
CERTIFICATE OF CORRECTION

| | |
|---|---|
| PATENT NO. | : 7,295,144 B1 |
| APPLICATION NO. | : 11/438999 |
| DATED | : November 13, 2007 |
| INVENTOR(S) | : Vaidyanathan Karthik, Partha Sarathy Murali and Sundaram Vanka |

It is certified that error appears in the above-identified patent and that said Letters Patent is hereby corrected as shown below:

Column 9, line 48 claim 3 "is a signed n bit" should be changed to --is a signed n bit value and--

Signed and Sealed this

Eighth Day of September, 2009

David J. Kappos
*Director of the United States Patent and Trademark Office*